United States Patent [19]

Steffes

[11] Patent Number: 5,337,464
[45] Date of Patent: Aug. 16, 1994

[54] METHOD OF CONVERTIBLY UPGRADING A PERSONAL COMPUTER

[75] Inventor: Karl M. Steffes, Austin, Tex.
[73] Assignee: Dell U.S.A., L.P., Austin, Tex.
[21] Appl. No.: 979,731
[22] Filed: Nov. 20, 1992
[51] Int. Cl.$^5$ .................... B21K 21/16; B23P 6/00; G06F 1/00
[52] U.S. Cl. .................... 29/401.1; 29/402.03; 29/402.08; 29/402.09; 29/831; 361/683; 361/685; 364/708.1; 439/61; 439/170
[58] Field of Search ............ 29/401.1, 402.03, 402.04, 29/402.08, 402.09, 592.1, 825, 830, 831; 361/413, 680, 681, 683, 684, 685, 393, 394; 364/708.1; 439/61, 62, 65, 170, 177; 395/575, 775

[56] References Cited

U.S. PATENT DOCUMENTS

| | | | |
|---|---|---|---|
| 3,764,857 | 10/1973 | Bartlett et al. | 361/681 |
| 4,401,351 | 8/1983 | Record | 439/61 |
| 5,136,468 | 8/1992 | Wong et al. | 361/683 |
| 5,162,675 | 11/1992 | Olsen et al. | 361/684 X |
| 5,174,762 | 12/1992 | Hoppal et al. | 439/61 |

FOREIGN PATENT DOCUMENTS

| | | | |
|---|---|---|---|
| 39175 | 11/1981 | European Pat. Off. | 439/61 |
| 2647972 | 12/1990 | France | 439/61 |

OTHER PUBLICATIONS

Guttridge et al., "Modularized PC Assembly", IBM Tech. Disclosure Bulletin, vol. 20, No. 6, Nov. 1977, pp. 2162-2163.

Allen et al., "Card on Segmented Board Electronic Package", IBM Tech. Disclosure Bulletin, vol. 19, No. 1, Jun. 1976, pp. 51-62.

Primary Examiner—Peter Dungba Vo
Attorney, Agent, or Firm—James Huffman; Rick Konneker

[57] ABSTRACT

Using a relatively simple four piece conversion kit consisting of a replacement control bracket, and vertically enlarged top housing portion, drive bay and expansion card cage replacement structures, a relatively small frame personal desktop computer is converted to a larger frame computer having upgraded expansion card and drive installation capacities. The upgrading process is effected simply by removing the existing top housing portion, drive bay, expansion card cage and control panel bracket, installing the replacement drive bay, expansion card cage and control panel bracket on the existing bottom side portion of the computer, and then operatively connecting the vertically enlarged top housing portion to the existing housing base wall. Other than the four components of the conversion kit, all of the components in the original computer are reused in the resulting upgraded computer.

15 Claims, 12 Drawing Sheets

METHOD OF CONVERTIBLY UPGRADING A PERSONAL COMPUTER

BACKGROUND OF THE INVENTION

The present invention generally relates to personal computers and, in a preferred embodiment thereof, more particularly relates to methods and apparatus for upgrading the operational capacity of a personal desktop computer.

The problem addressed by the present invention is the expense of upgrading a relatively small frame personal desktop computer from a capacity expansion standpoint—i.e., with respect to its drive capacity and/or its expansion card capacity. Typically, the motherboard, back connections and other internal connective structure differ from a relatively small frame personal desktop computer to a larger frame personal desktop computer. Accordingly, the conventional method of upgrading a relatively small frame computer (after its expansion card and/or drive installation capacity has been reached) has been to simply replace the entire small frame computer with a larger frame computer—i.e., to buy a whole new computer simply to obtain a larger expansion card and/or drive installation capacity which the smaller computer cannot accommodate from physical size and mechanical connection standpoints.

In view of the foregoing, it is accordingly an object of the present invention to provide methods and associated apparatus for upgrading a personal desktop computer, from a capacity expansion standpoint, in a more economical manner that avoids the previous expensive upgrade solution of replacing the entire computer simply to increase its expansion card and/or drive installation capacity.

SUMMARY OF THE INVENTION

In carrying out principles of the present invention, in accordance with a preferred embodiment thereof, a relatively small frame personal desktop computer is upgraded, using a specially designed upgrade kit embodying principles of the present invention, to a larger frame personal desktop computer having increased disk drive and expansion card installation capacities. According to a key feature of the present invention, the resulting upgraded computer reuses the lower housing portion, and a substantial number of the existing internal operating components, of the original computer. The conventional necessity of simply replacing a small frame computer, in its entirety, with a larger frame computer to obtain additional expansion card/disk drive installation capacities beyond the maximum corresponding card/drive installation capacities of the original computer is advantageously avoided, and the upgrading process may be carried out at a considerably lowered cost to the computer owner.

The relatively small frame personal desktop computer upgraded by apparatus and methods of the present invention representatively is of the type having removably interconnectable top and bottom housing portions which, when connected to one another, substantially enclose the internal operating components of the computer. The bottom housing portion has a base wall with a back wall projecting upwardly from a rear edge portion thereof, and the top housing portion has an upper side wall having opposite vertical side walls depending from opposite side edge portions thereof, and a from end wall depending from a from end edge portion thereof and extending between the opposite vertical side walls.

The internal operating components of the computer partially include (1) a drive bay structure adapted to operatively receive a first maximum number of disk drives; (2) an expansion card cage structure adapter to operatively receive a first maximum number of expansion cards; and (3) a control panel bracket removably supporting a control panel, a battery and a speaker. In the assembled computer, the upper side wall of the top housing portion closely overlies the tops of the drive bay and expansion card cage structures.

In an illustrated preferred embodiment thereof, the upgrade kit comprises four replacement components installable in place of their existing counterparts in the original computer —(1) a replacement drive bay structure having a substantially greater installation height than that of the original drive bay structure and being adapted to operatively receive a greater number of disk drives; (2) a replacement expansion card cage structure having a substantially greater installation height than that of the original expansion card cage structure and being adapted to operatively receive a greater number of expansion cards; (3) a replacement control bracket adapted to support the control panel, speaker and battery components after removal thereof from the original bracket; and (4) a replacement top housing portion having an increased vertical height, compared to the original top housing portion, to accommodate the increased installation heights of the replacement drive bay and expansion card cage structures, the replacement top housing portion further having a back wall filler portion which cooperates with the bottom housing portion back wall to close off the back of the upgraded computer.

Using this upgrade kit, the computer owner may upgrade his original computer simply by removing its top housing portion, drive bay structure, expansion card cage structure, and control panel bracket. After transferring the control panel, speaker and battery from the removed control panel bracket to the replacement bracket, transferring the disk drive(s) from the removed drive bay structure to the replacement drive bay structure, and transferring the expansion card(s) from the removed expansion card cage structure, the owner simply installs the four replacement components on the remaining original computer structure in place of the four removed components. The result is an upgraded computer which economically reuses the original bottom housing portion, and at least a substantial number of the other original internal computer operating components, thereby advantageously avoiding the conventional necessity of replacing the original computer, in its entirety, to achieve this desirable card and drive installation capacity upgrade.

It will be readily appreciated by those of reasonable skill in this particular art that, if desired, the method described above could be used to upgrade only the disk drive installation capacity, or only the expansion card installation capacity of the original computer by simply eliminating the replacement drive bay structure or the replacement expansion card cage structure as the case may be.

DETAILED DESCRIPTION

As sequentially illustrated in FIGS. 1A, 1B through FIGS. 6A, 6B the present invention uniquely provides a method and associated conversion kit apparatus for economically converting a relatively small frame personal desktop computer 10 (FIGS. 1A and 1B) to a larger frame personal desktop computer 10a (FIGS. 6A and 6B), having both larger drive and expansion card installation capacities. As will be seen, this desirable upgrade is achieved not by replacing the entire computer 10 with a whole new, larger capacity computer, but by simply replacing four components of the computer 10 and economically reusing the entire balance of the original computer.

Figure 1A:
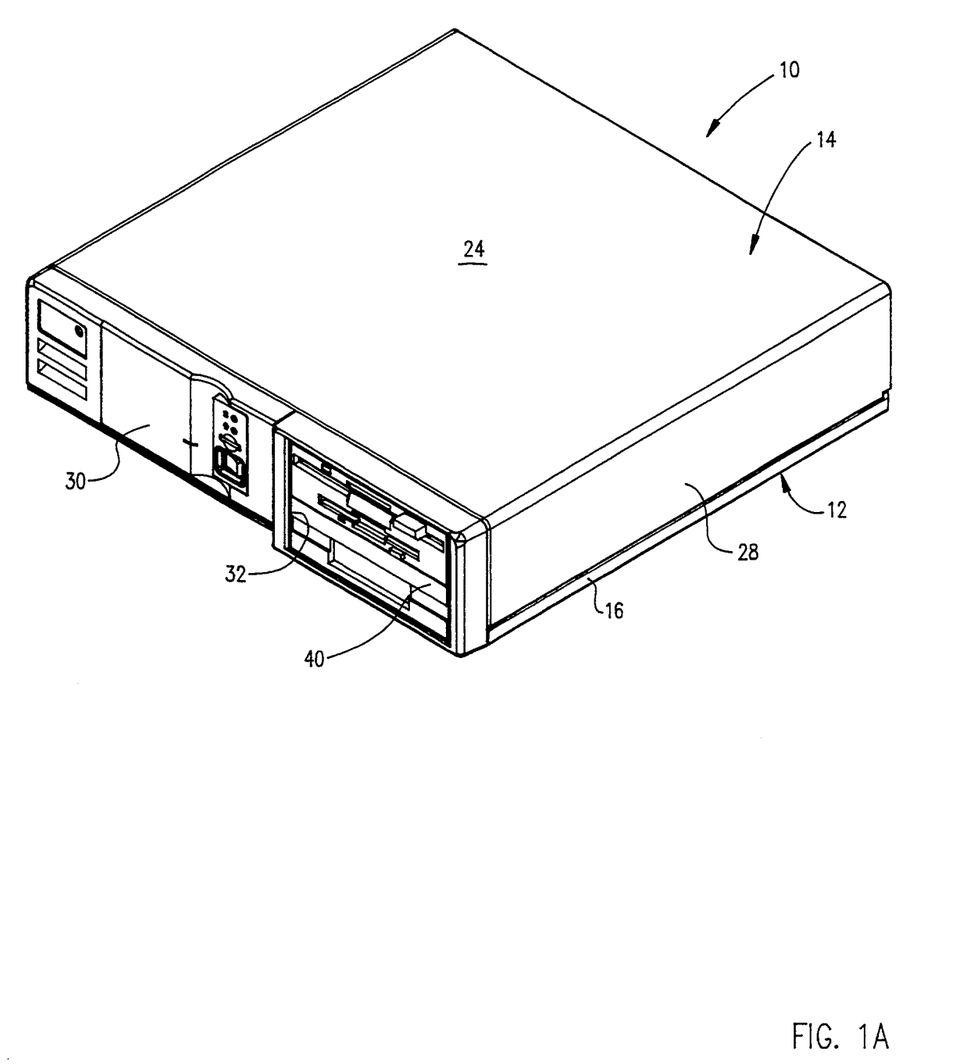
FIGS. 1A and 1B respectively, are front and rear side perspective views of a relatively small frame personal desktop computer which is to be upgraded using a uniquely economical upgrading method of the present invention sequentially illustrated in FIGS. 1A–6B.
Figure 1B:
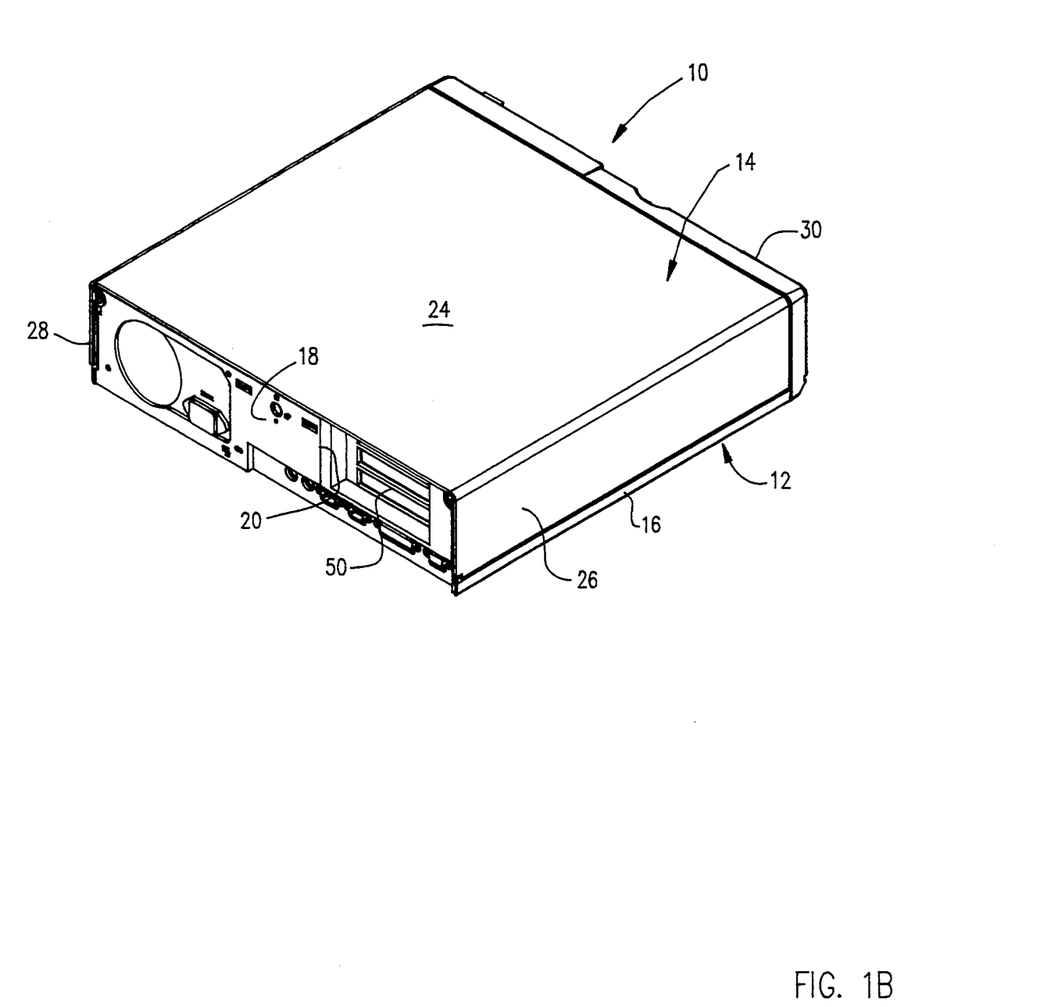
Figure 2A:
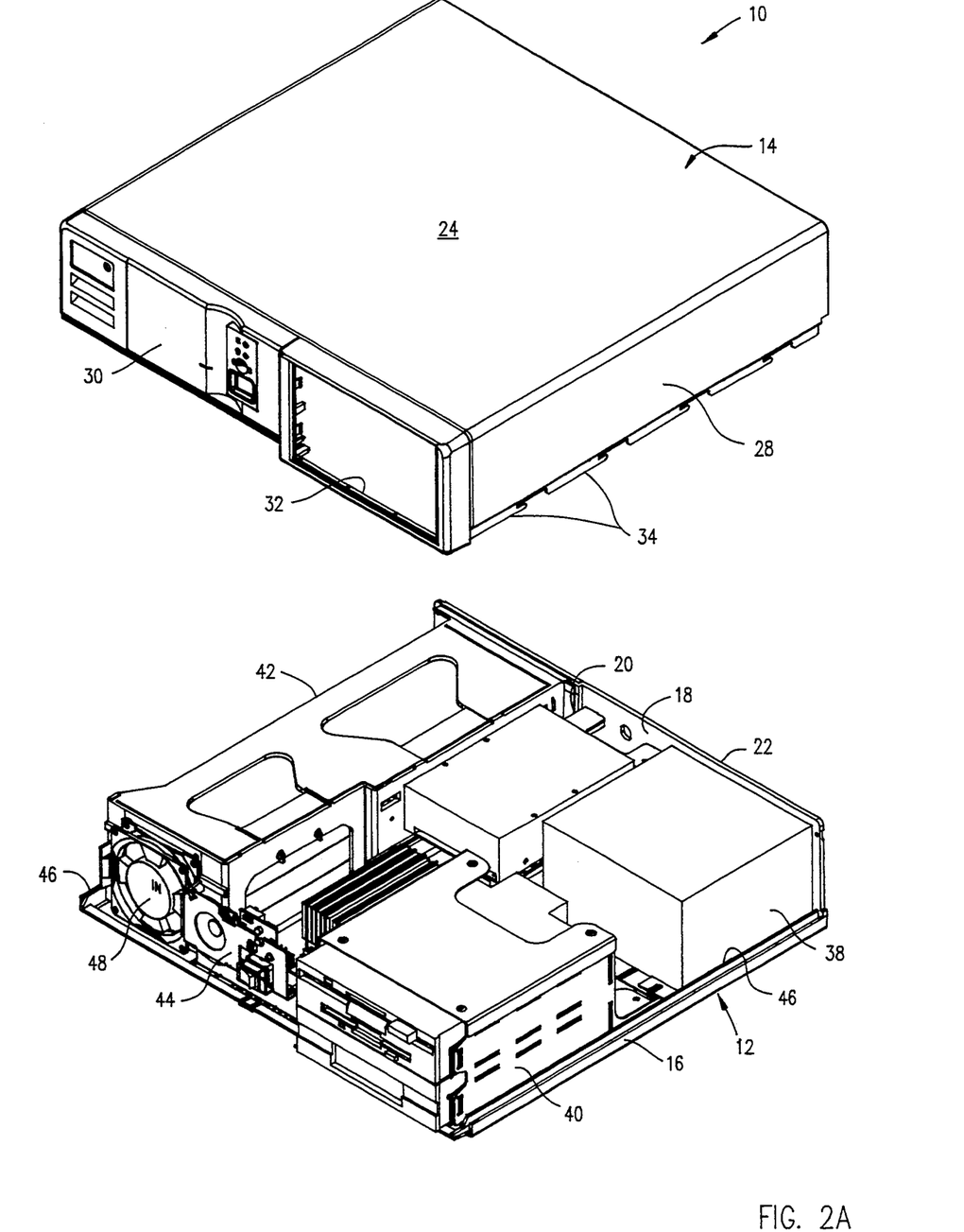
FIGS. 2A and 2B respectively, are partially exploded front and rear side perspective views of the computer to be upgraded.
Figure 2B:
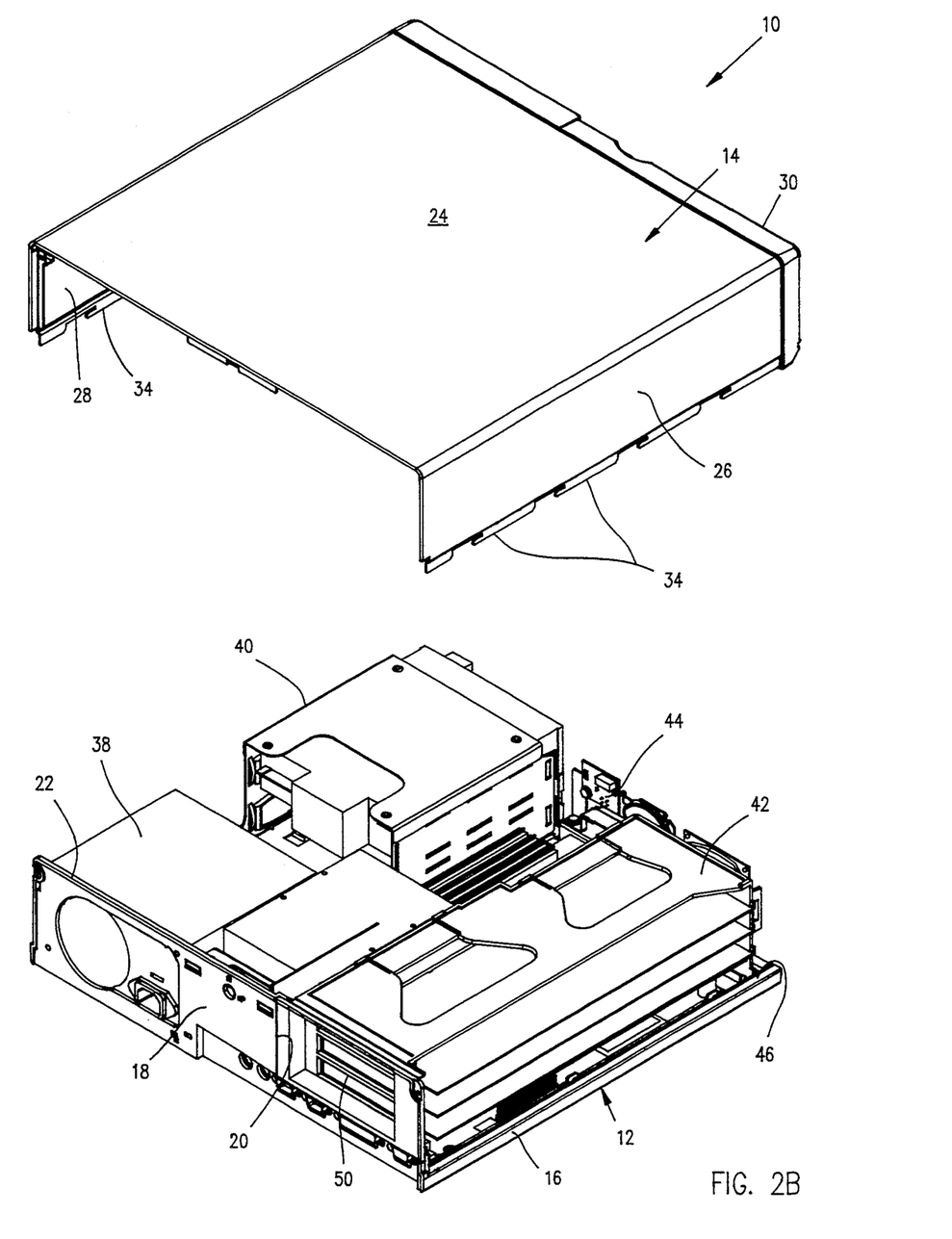
Figure 3A:
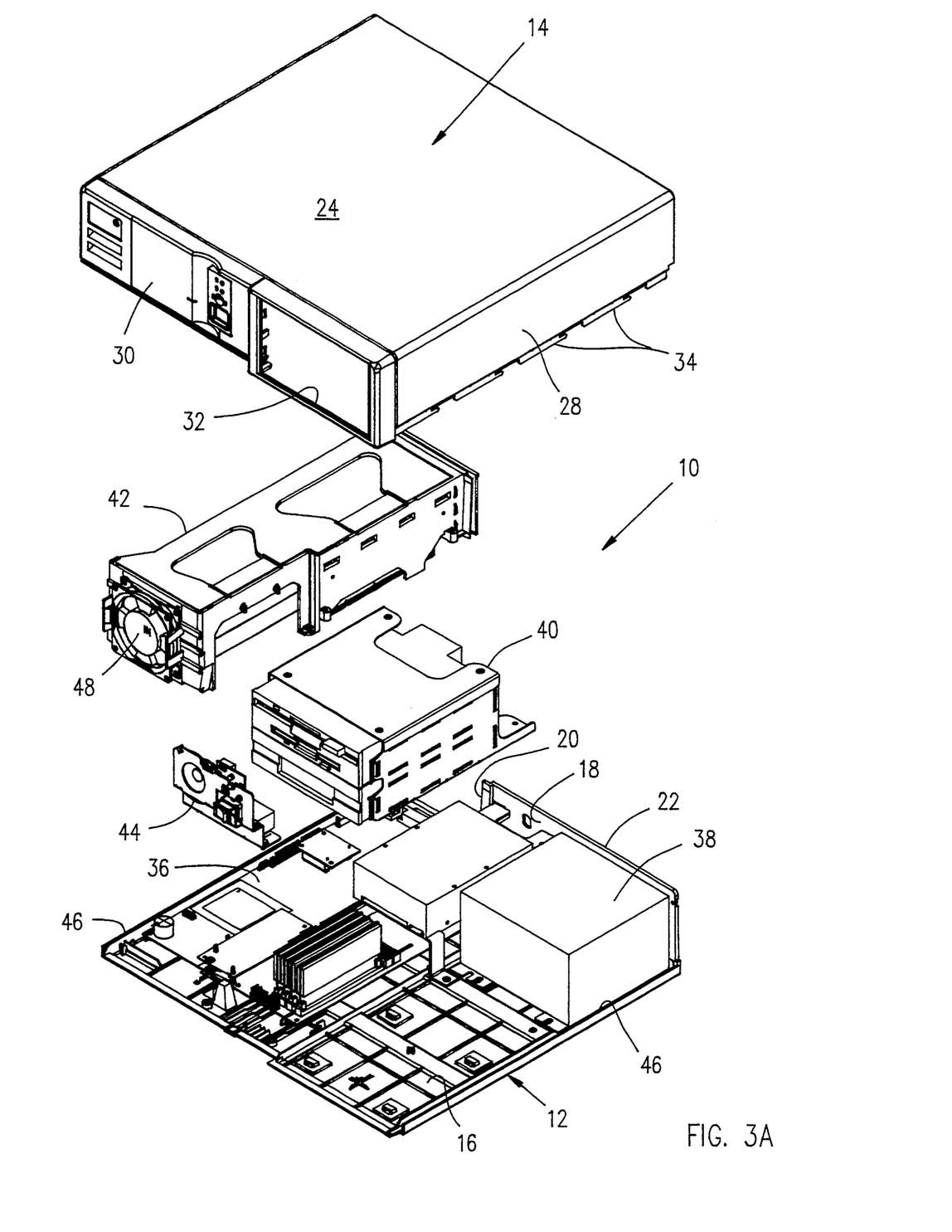
FIGS. 3A and 3B, respectively, are further exploded front and rear side perspective views of the computer to be upgraded.
Figure 3B:
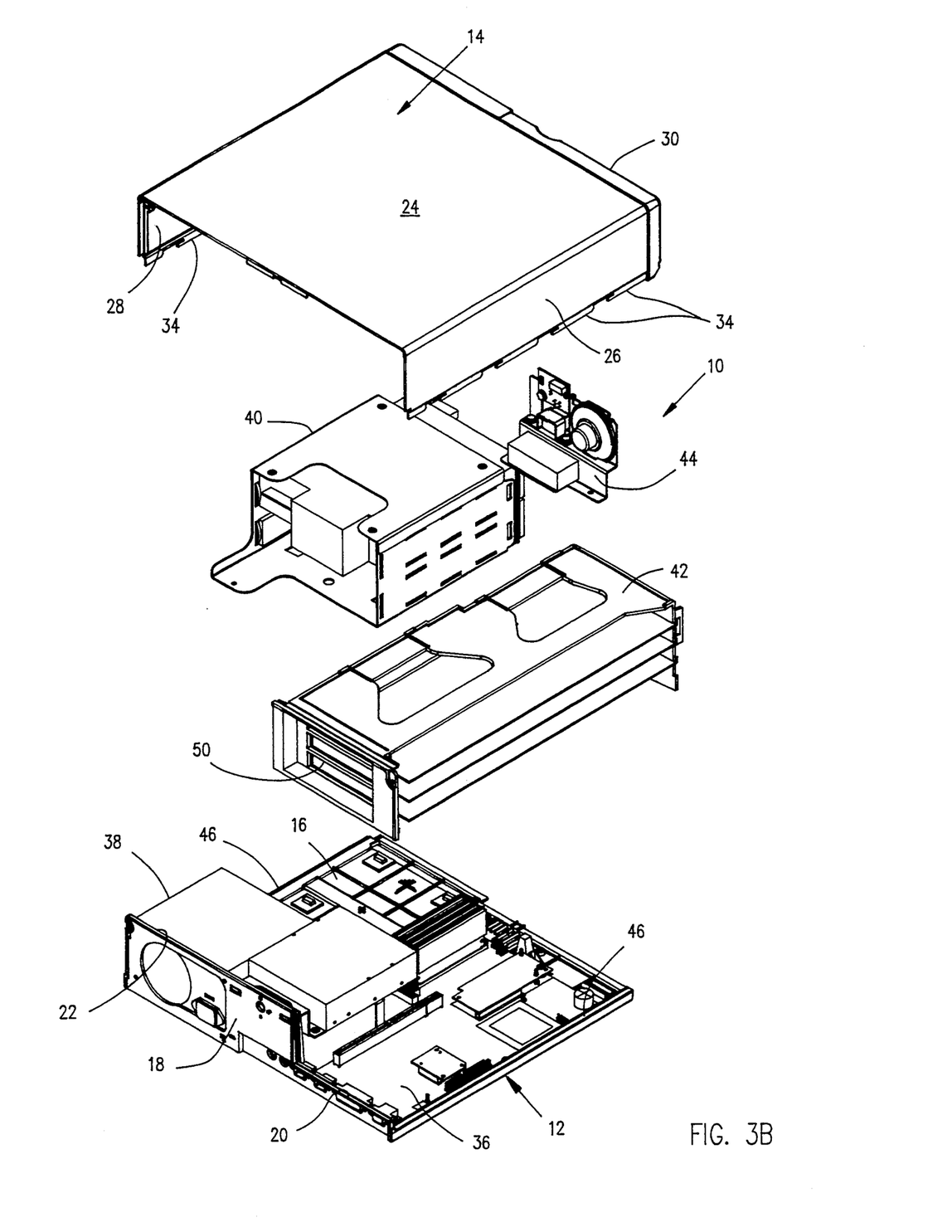

The original computer 10 is illustrated in FIGS. 1A–3B and includes a rectangular housing structure having a base portion 12, and a top portion 14 removably secured to the base portion. The housing base portion 12 has a rectangular bottom wall 16 from the rear edge of which a back wall 18 upwardly projects. As best illustrated in FIGS. 3A and 3B, the back wall 18 has a rectangular top side cutout area 20 formed in one end thereof, and a top side edge portion 22. The removable top housing portion 14 has a rectangular upper side wall 24, vertical side walls 26,28 depending from opposite side edges of the upper side wall 24, and a front end wall 30 having a rectangular opening 32 adjacent its juncture with the side wall 28. Depending from the bottom side edges of the housing top portion side walls 26,28 are spaced series of rearwardly opening latch hook attachment members 34.

Mounted atop the bottom housing wall 16, within the assembled housing structure, are the various operating components of the computer 10 including a motherboard 36, a hard disk drive 38, a drive bay structure 40 representatively containing its maximum capacity of two floppy drives, an expansion card cage 42 representatively containing its maximum capacity of three expansion cards, and a control panel bracket 44 upon which the battery, speaker and control panel portions of the computer 10 are mounted.

With these and the other illustrated operating components of the computer 10 installed on the bottom housing wall 16, the top housing portion 14 is removably attached to the housing base portion 12, to enclose the computer operating components within the assembled housing structure, by moving the top housing portion 14 downwardly from its FIG. 2A position until the latch hooks 34 enter connection slots (not shown) formed in channel portions 46 extending along opposite sides of the bottom housing wall 16. The top housing portion 14 is then moved rearwardly relative to the bottom housing wall 16 to releasably lock the hooks 34 into place within their associated channel slots, thereby operatively positioning the top housing portion 14 on the housing base portion 12.

While other types of expansion card cage structures could be used, the illustrated expansion card cage structure 42 is representatively of the type illustrated and described in copending U.S. patent application Ser. No. 967,903, filed on Oct. 27, 1992 and entitled "EXPANSION CARD/RISER CARD MODULE FOR DESKTOP COMPUTERS", owned by the assignee of the instant application. As described in more detail in such copending application, the cage structure 42 internally carries its expansion cards and is removably installable, via a plug-in connection, on the motherboard 36 to operatively connect its expansion cards thereto.

As best illustrated in FIGS. 3A and 3B, the card cage structure 42 has an auxiliary cooling fan 48 removably snap-fitted onto its front end, and a rear end portion conveniently configured to define an I/O port portion 50 of the computer 10. With the top housing portion 14 operatively attached to the housing base portion 12, the I/O port portion 50 is received in and accessible through the back wall cutout area 20, and the front end of the drive bay 40 is received in and accessible through the from end wall opening 32. Additionally, the top sides of the drive bay 40 and the expansion card cage 42 are closely adjacent the underside of the upper housing side wall 24.

Figure 6A:
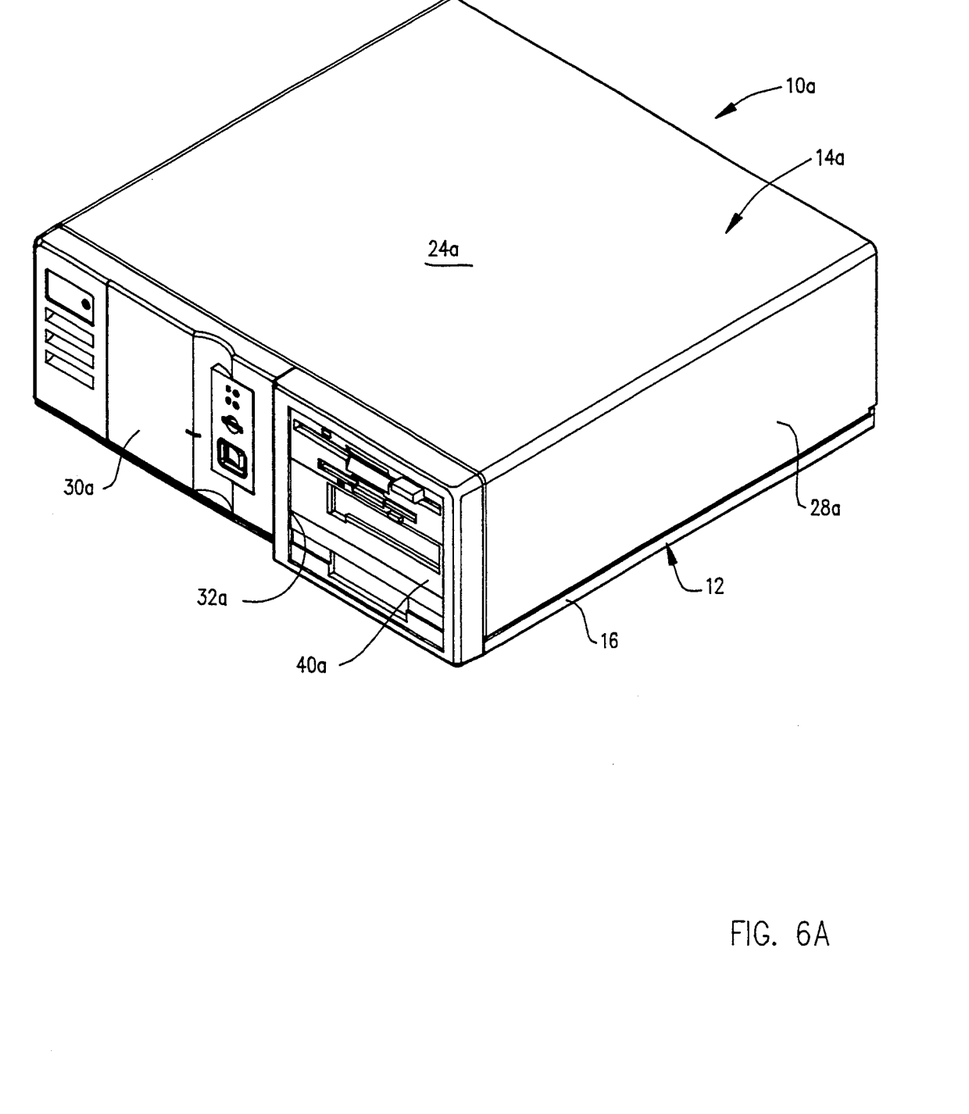
FIGS. 6A and 6B, respectively, are front and rear side perspective views of the upgraded, larger frame personal desktop computer resulting from the upgrading method of the present invention.
Figure 6B:
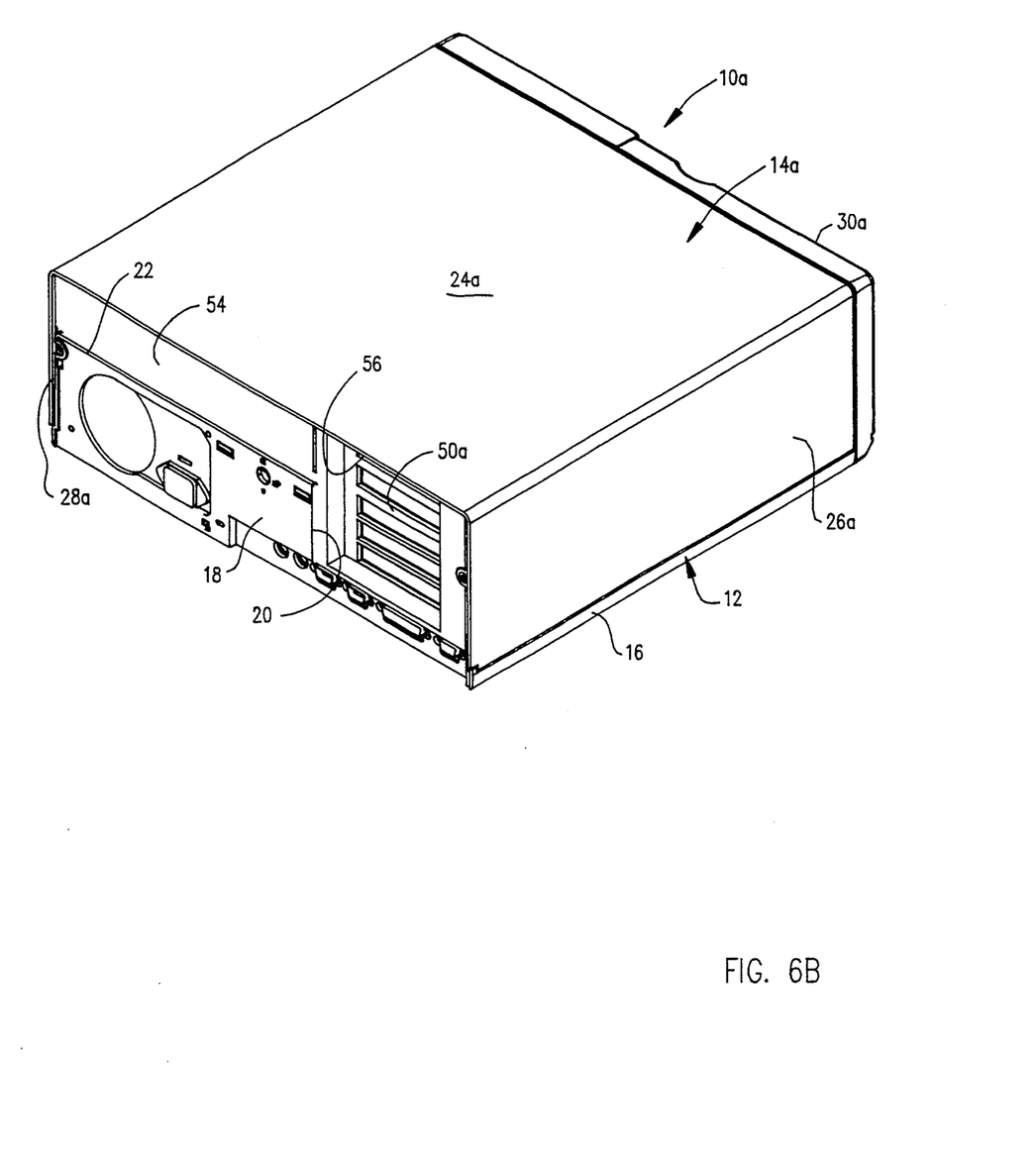

To economically convert the assembled, relatively small frame computer 10 shown in FIGS. 1A and 1B to the larger frame computer 10a shown in FIGS. 6A and 6B, and having an upgraded drive and expansion card installation capacity, the following upgrading method which embodies principles of the present invention is utilized.

First, as shown in FIGS. 2A and 2B, the top housing portion 14 is removed from the assembled computer 10 shown in FIGS. 1A and 1B to thereby expose its internal operating components. Next, as shown in FIGS. 3A and 3B, the drive bay 40, the expansion card cage 42, and the control panel bracket 44 are removed from the computer 10, leaving the rest of its internal operating components in place on the bottom housing wall 16. The removed housing and operating components 14, 40, 42 and 44 are then set aside and replaced with a specially designed four component upgrade kit generally indicated by the reference numeral 52 in FIGS. 4A and 4B.

Figure 4A:
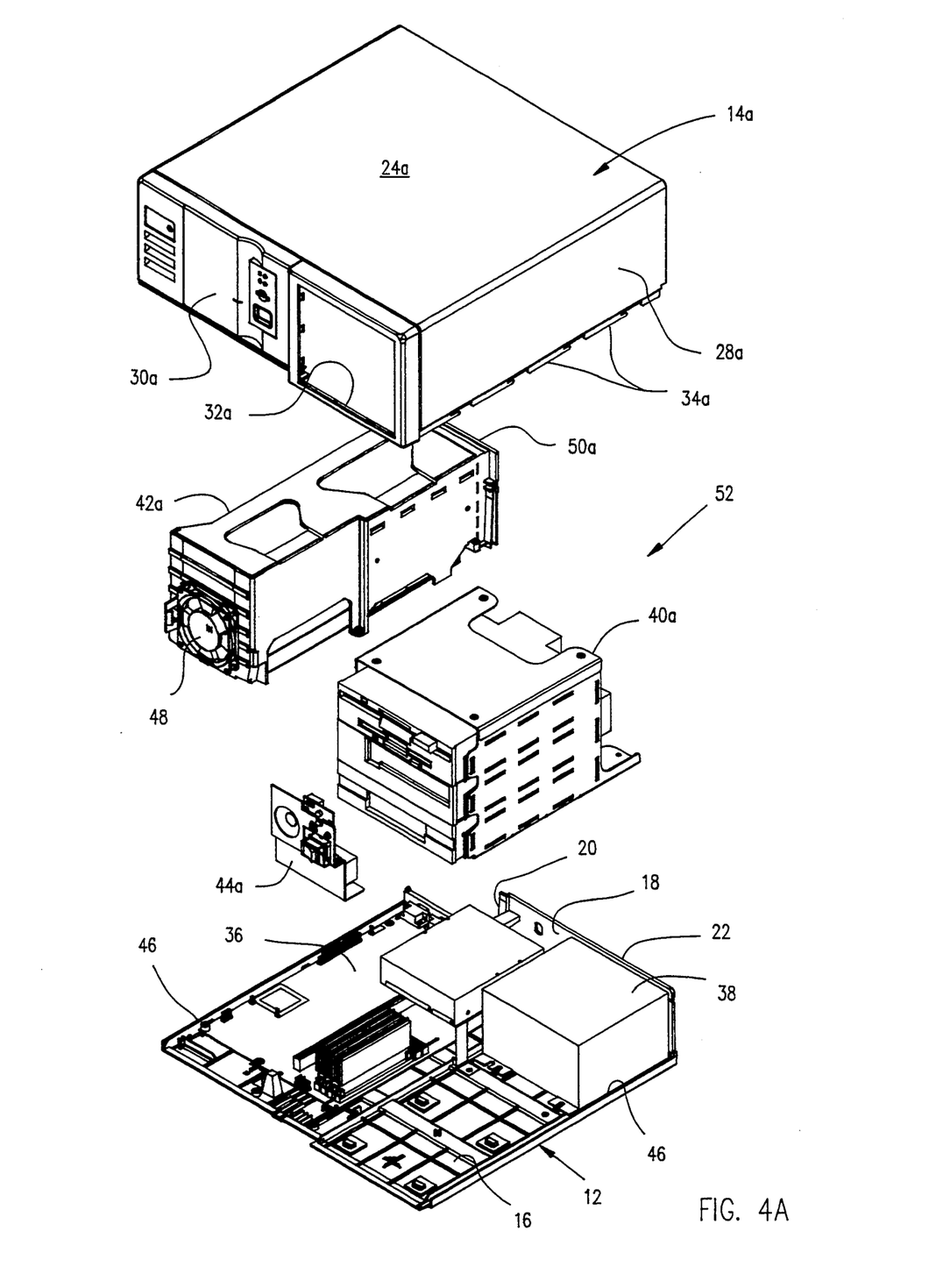
FIGS. 4A and 4B, respectively, are partially exploded front and rear side perspective views of the computer with new housing, drive bay, card cage and control panel bracket structures used to replace smaller counterpart structures removed from the original computer.
Figure 4B:
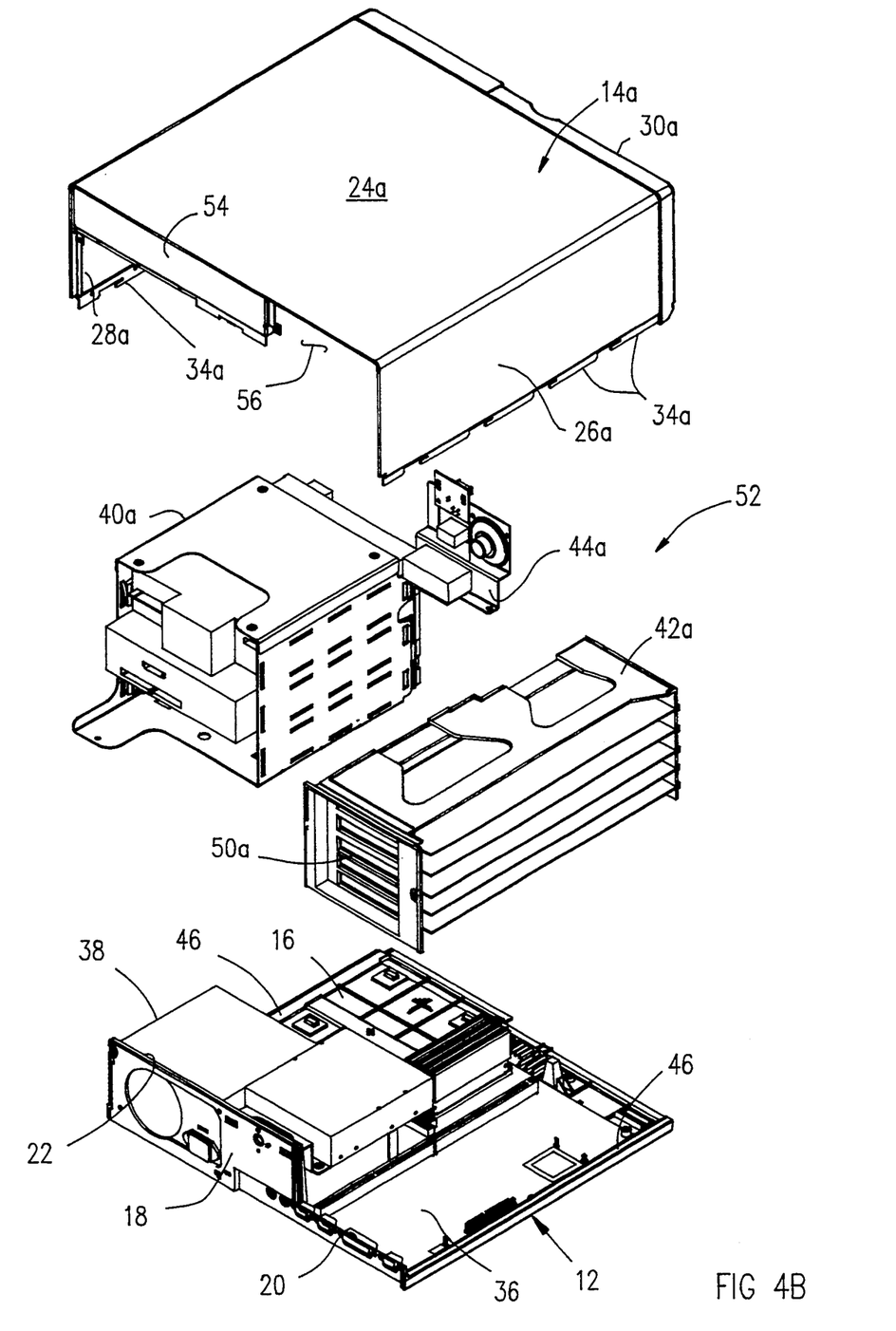

Upgrade kit 52 includes a replacement top housing portion 14a, a replacement drive bay 40a, a replacement expansion card cage 42a, and a replacement control panel bracket 44a. Compared to its removed counterpart 40, the replacement drive bay 40a has the same horizontal footprint and may be identically attached to the bottom housing wall 16, but is vertically larger and is adapted to hold three floppy drives instead of the two floppy drives held by the removed drive bay 40. Before installing the replacement drive bay 40a, the two drives are removed from the drive bay 40 and operatively inserted into the replacement drive bay 40a.

In a similar fashion, the replacement expansion card cage 42a has a horizontal footprint identical to its removed counterpart 42, and may be operatively connected to the motherboard 36 in an identical manner. However, the cage 42a is vertically larger than the removed cage 42 and has five vertically stacked card bays, thereby allowing it to hold five expansion cards instead of the three held by the removed cage 42. The height of the I/O port structure 50a at the rear end of the replacement cage 42a is correspondingly increased. Before installing the vertically larger cage 42a on the bottom housing wall 16, the expansion cards are removed from the cage 42 and operatively inserted into the replacement cage 42a. Similarly, the cooling fan 48 is removed from the cage 42 and snapped onto the front end of the cage 42. Also, the battery, speaker and control panel components are removed from the control panel bracket 44 and reinstalled on the replacement bracket 44a before it is operatively connected to the bottom housing wall 16.

Figure 5A:
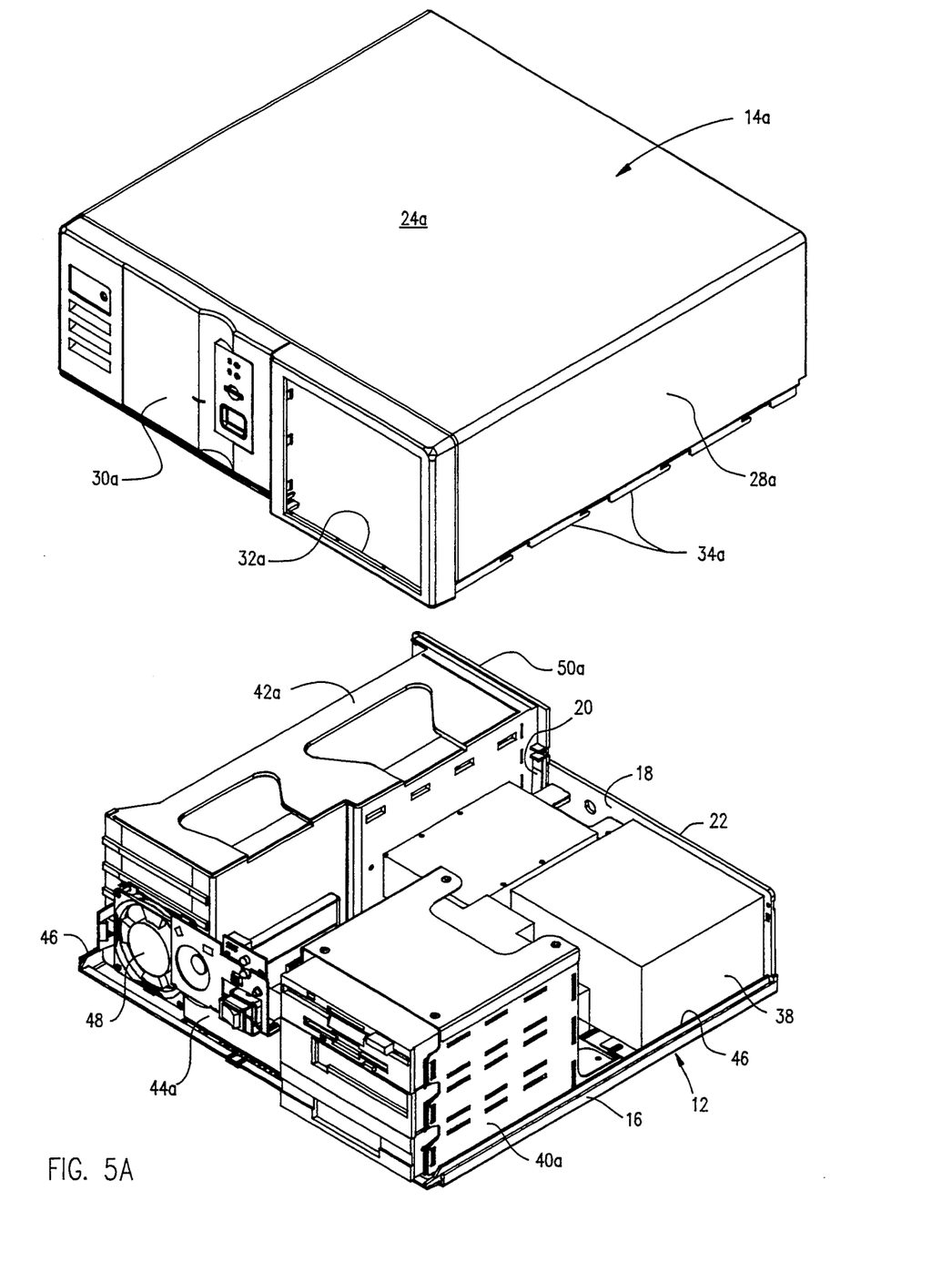
FIGS. 5A and 5B, respectively, are partially exploded front and rear side perspective views of the computer with the replacement drive bay, card cage and control panel bracket structures operatively installed therein.
Figure 5B:
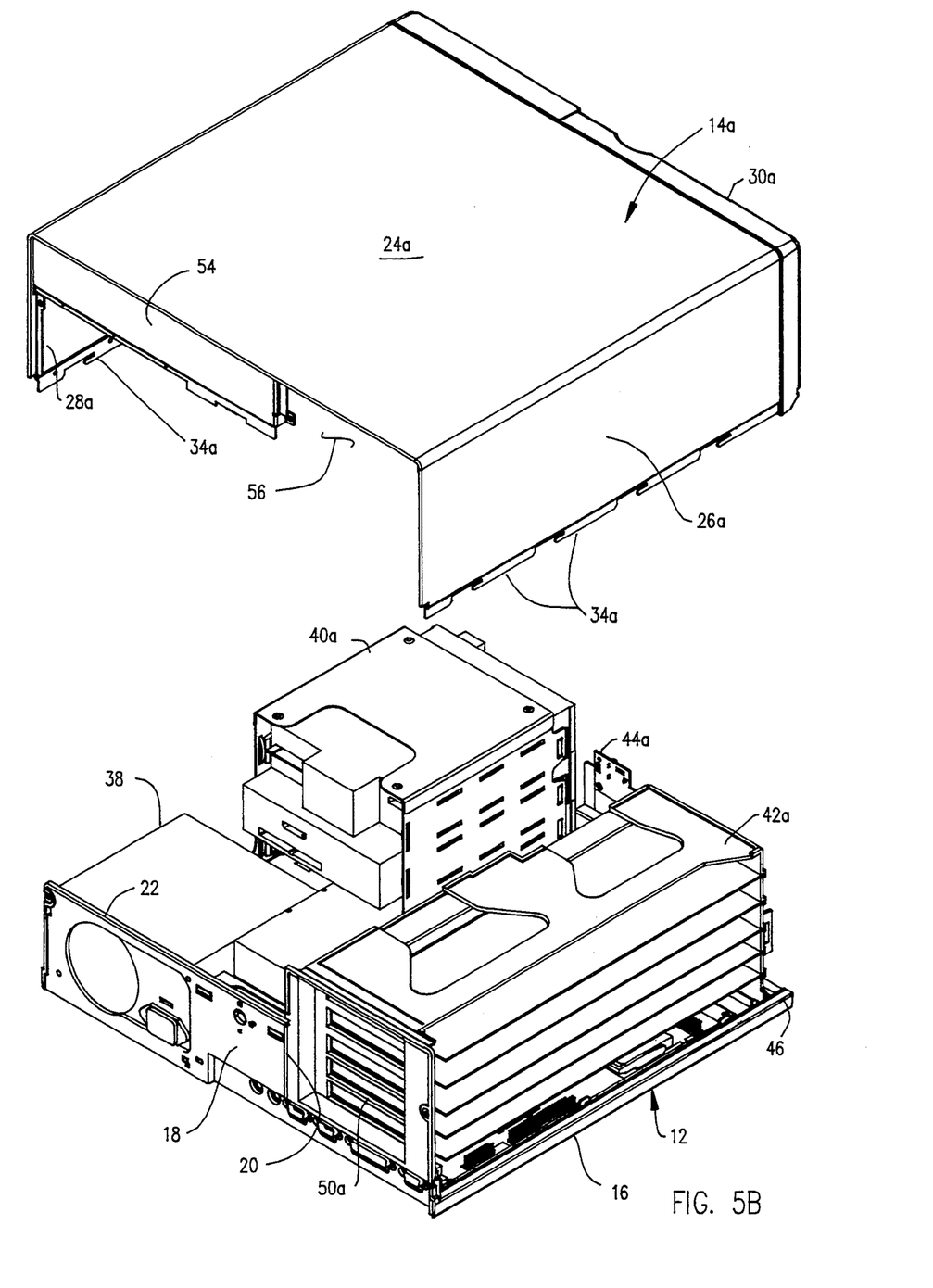

Next, as illustrated in FIGS. 5A and 5B, the replacement drive bay 40a, expansion card cage 42a, and control panel bracket 44a are operatively connected to the bottom housing wall 16 in place of the removed components 40, 42 and 44.

The replacement top housing portion 14a has a rectangular upper side wall 24a of a size identical to that of the upper side wall 24a of the removed top housing portion 14, a pair of opposite vertical side walls 26a and 28a, and a front wall 30a having a rectangular opening 32a therein adjacent its juncture with the side wall 28a. Compared to the walls 26,28 and 30, and the opening 32 in the removed top housing portion 14, the walls 26a,28a and 30a, and the opening 32a in the replacement top housing portion 14a are vertically larger by a distance corresponding to the increased heights of the drive bay 40a and the expansion card cage 42a. Latch hooks 34a, identical in size and configuration to the latch hooks 34 on the removed top housing portion 14, are formed on the bottom side edges of the side walls 26a,28a of the replacement top housing portion 14a.

As best illustrated in FIGS. 4B and 5B, the otherwise open rear end of the replacement top housing portion 14a has a horizontally elongated rectangular wall filler portion 54 disposed in an upper left corner of the rear housing portion end as viewed in these figures. The vertical height of the filler portion 54 is essentially equal to the increased heights of the replacement components 40a,42a compared to their removed counterpart components 40 and 42. The fight end of the filler portion 54 stops short of the housing portion side wall 26a, thereby leaving a rectangular gap 56 between the fight end of the filler portion 54 and the side wall 26a. The horizontal width of the gap 56 is equal to the horizontal width of the bottom housing portion back wall cutout area 20.

The assembly of the upgraded computer 10a shown in FIGS. 6A and 6B is completed simply by removably securing the top housing portion 14a to the existing bottom housing wall 16 as previously described in conjunction with the removed top housing portion 14. With the top housing portion 14a installed in this manner, the vertically enlarged front end of the replacement drive bay 40a is complementarily received in and accessible through the front wall opening 32a (see FIG. 6A), the bottom side edge of the rear filler wall portion 54 (see FIG. 6B) is contiguous with the top side edge 22 of the back housing wall 18, and the vertically enlarged I/O port structure 50a is complementarily received in and accessible through the rectangular opening combinatively defined by the back wall cutout area 20 and the back end gap 56 of the top housing portion 14a.

It can be seen from the foregoing that, using a method and apparatus of the present invention, a rapid and economical capacity upgrade has been performed on the original computer 10 reusing all but four of its original components. The previous necessity of replacing the entire computer 10 in order to achieve this upgrade has thus been advantageously avoided. Given the relative simplicity of the upgrade kit 54, and its replacement installation on the original computer, it will be readily appreciated that this conversion is one that may be readily effected by a computer owner of only little mechanical ability.

The foregoing detailed description is to be clearly understood as being given by way of illustration and example only, the spirit and scope of the present invention being limited solely by the appended claims.

What is claimed is:

1. A method of increasing the drive installation capacity of an existing personal computer having:
   an existing bottom housing portion having a base wall with a back wall projecting upwardly from a rear edge portion thereof,
   existing operating components, including an existing drive bay structure, disposed atop the base wall,
      the existing drive bay structure being adapted to operatively receive a first maximum number of disk drives, and
   an existing top housing portion comprising an upper side wall having opposite side walls depending from opposite side edge portions thereof, and a front end wall depending from a front end edge portion thereof and extending between the opposite side walls,
      the existing top housing portion being removably connected to the existing bottom housing portion and cooperating therewith to substantially enclose the existing operating components, the upper side wall of the existing top housing portion closely overlying the top of the existing drive bay structure, said method comprising the steps of:
   removing the existing top housing portion from the existing bottom housing portion to expose the existing operating components;
   removing the existing drive bay structure;
   replacing the removed existing drive bay structure with a vertically enlarged replacement drive bay structure adapted to operatively receive a second maximum number of disk drives, said second maximum number of disk drives being larger than said first maximum number of disk drives; and
   operatively connecting a replacement top housing portion to the existing bottom housing portion in place of the removed existing top housing portion, the connected replacement top housing portion cooperating with the existing bottom housing portion to substantially enclose the existing and replacement operating components; said replacement top housing portion being vertically enlarged to accommodate the vertically enlarged replacement drive bay structure, whereby, in the resulting upgraded computer, the existing bottom housing portion and at least a substantial number of the existing operating components are reused.

2. The method of claim 1 wherein:

said replacement drive bay structure is adapted to operatively receive a plurality of floppy disk drives and has a front end portion, and said method further comprises the step of forming an opening in the from end wall portion of said replacement top housing portion, said opening being configured to complementarily receive and exteriorly expose said front end portion of said replacement drive bay structure in the upgraded computer.

3. The method of claim 1 further comprising the step of:

providing said replacement top housing portion with a back wall segment depending from a rear edge portion of its top side wall, said back wall segment having a vertical height generally equal to the height difference between the existing and replacement top housing portions, and a lower side edge portion positioned to be contiguous with an upper side edge portion of the back wall of the existing bottom housing portion when said replacement top housing portion is operatively connected to the existing bottom housing portion.

4. A method of increasing the expansion card installation capacity of an existing personal computer having:

an existing bottom housing portion having a base wall with a back wall projecting upwardly from a rear edge portion thereof, existing operating components, including an existing expansion card cage structure, disposed atop the base wall, the existing expansion card cage structure being adapted to operatively receive a first maximum number of expansion cards, and an existing top housing portion comprising an upper side wall having opposite side walls depending from opposite side edge portions thereof, and a front end wall depending from a front end edge portion thereof and extending between the opposite side walls, the existing top housing portion being removably connected to the existing bottom housing portion and cooperating therewith to substantially enclose the existing operating components, the upper side wall of the existing top housing portion closely overlying the top of the existing expansion card cage structure, said method comprising the steps of:

removing the existing top housing portion from the existing bottom housing portion to expose the existing operating components;

removing the existing expansion card cage structure;

replacing the removed existing expansion card cage structure with a vertically enlarged replacement expansion card cage structure adapted to operatively receive a second maximum number of expansion cards, said second maximum number of expansion cards being larger than said first maximum number of expansion cards; and operatively connecting a replacement top housing portion to the existing bottom housing portion in place of the removed existing top housing portion, the connected replacement top housing portion cooperating with the existing bottom housing portion to substantially enclose the existing and replacement operating components and being vertically enlarged to accommodate the vertically enlarged replacement expansion card cage structure, whereby, in the resulting upgraded computer, the existing bottom housing portion and at least a substantial number of the existing operating components are reused.

5. The method of claim 4 wherein:

said replacement expansion card cage structure has a rear end portion defining an I/O port structure, and said method further comprises the step of configuring a rear end portion of said replacement top housing portion to cooperate with a rear end portion of the existing bottom housing portion in a manner combinatively defining therewith a housing opening which, in the upgraded computer, complementarily receives and exteriorly exposes said I/O port structure.

6. The method of claim 4 wherein:

the existing expansion card cage structure has an auxiliary cooling fan removably snap-fitted thereon, and said method further comprises the steps of removing the auxiliary cooling fan from the existing expansion card cage structure and snap-fitting the removed auxiliary cooling fan onto said replacement expansion card cage structure.

7. The method of claim 4 wherein:

the existing operating components further include a motherboard, left in place in the upgraded computer, said replacement expansion card cage structure is adapted to operatively receive its associated expansion cards for movement therewith, and is operatively connectable to the motherboard in a manner operatively connecting the associated expansion cards to the motherboard as well, and said step of replacing the removed existing expansion card cage structure includes the step of operatively connecting said replacement expansion card cage structure to the motherboard.

8. The method of claim 4 further comprising the step of:

providing said replacement top housing portion with a back wall segment depending from a rear edge portion of its top side wall, said back wall segment having a vertical height generally equal to the height difference between the existing and replacement top housing portions, and a lower side edge portion positioned to be contiguous with an upper side edge portion of the back wall of the existing lower housing portion when said replacement top housing portion is operatively connected to the existing bottom housing portion.

9. A method of upgrading an existing personal computer having:

an existing bottom housing portion having a base wall with a back wall projecting upwardly from a rear edge portion thereof, existing operating components, including an existing drive bay structure and an existing expansion card cage structure, disposed atop the base wall, the existing drive bay structure being adapted to operatively receive a first maximum number of disk drives, and the expansion card cage structure being adapted to operatively receive a first maximum number of expansion cards, and an existing top housing portion comprising an upper side wall having opposite side walls depending from opposite side edge portions thereof, and a front end wall depending from a front end edge portion thereof and extending between the opposite side walls, the existing top housing portion being removably connected to the existing bottom housing portion and cooperating therewith to substantially enclose the existing operating components, the upper side wall of the existing top housing portion closely overlying the tops of the existing drive bay structure and the existing expansion card cage structure, said method comprising the steps of:

removing the existing top housing portion from the existing bottom housing portion to expose the existing operating components;

removing the existing drive bay structure;

replacing the removed existing drive bay structure with a vertically enlarged replacement drive bay structure adapted to operatively receive a second maximum number of disk drives, said second maximum number of disk drives being larger than said first maximum number of disk drives;

removing the existing expansion card cage structure;

replacing the removed existing expansion card cage structure with a vertically enlarged replacement expansion card cage structure adapted to operatively receive a second maximum number of expansion cards, said second maximum number of expansion cards being larger than said first maximum number of expansion cards; and operatively connecting a replacement top housing portion to the existing bottom housing portion in place of the removed existing top housing portion, the connected replacement top housing portion cooperating with the existing bottom housing portion to substantially enclose the existing and replacement operating components and being vertically enlarged to accommodate the vertically enlarged replacement drive bay and expansion card cage structures, whereby, in the resulting upgraded computer, the existing bottom housing portion and at least a substantial number of the existing operating components are reused.

10. A method of upgrading an existing personal computer having:

an existing bottom housing portion having a base wall with a back wall projecting upwardly from a rear edge portion thereof, existing internal operating components disposed atop the base wall, the existing internal operating components partially including:

an existing drive bay structure adapted to operatively receive a first maximum number of disk drives, an existing expansion card cage structure adapted to operatively receive a first maximum number of expansion cards, an existing control panel bracket removably supporting a control panel, a battery and a speaker, and an existing top housing portion comprising an upper side wall having opposite vertical side walls depending from opposite side edge portions thereof, and a front end wall depending from a front end edge portion thereof and extending between the opposite vertical side walls, the existing top housing portion being removably connected to the existing bottom housing portion and cooperating therewith to substantially enclose the existing internal operating components, the upper side wall of the existing top housing portion closely overlying the tops of the existing drive bay and expansion card cage structures, said method comprising the steps of:

providing an upgrade kit including:

a replacement drive bay structure having an installation height substantially larger than that of the existing drive bay structure, said replacement drive bay structure being adapted to operatively receive a second maximum number of disk drives, said second maximum number of disk drives being larger than said first maximum number of disk drives, a replacement expansion card cage structure having an installation height substantially larger than that of the existing expansion card cage structure, said replacement expansion card cage structure being adapted to operatively receive a second maximum number of expansion cards larger than said first maximum number of expansion cards, a replacement control panel bracket, and a replacement top housing portion having a height greater than that of the existing top housing portion, and further having a back wall portion depending from a rear edge portion of its top side wall and having a vertical height substantially equal to the height difference between the existing and replacement top housing portions;

removing the existing top housing portion from the existing bottom housing portion to expose the existing internal operating components;

removing the existing control panel bracket, drive bay structure and expansion card cage structures;

detaching the control panel, battery and speaker from the existing control panel bracket;

installing the detached control panel, battery and speaker on said replacement control panel bracket;

respectively installing the replacement drive bay structure, expansion card cage structure and control panel bracket in place of the removed existing drive bay structure, expansion card cage structure and control panel bracket; and operatively connecting said replacement top housing portion to the existing bottom housing portion in place of the removed existing top housing, the connected replacement top housing portion cooperating with the existing bottom housing portion to substantially enclose the remaining existing internal operating components and the replacement drive bay structure, expansion card cage structure and control panel bracket, with a lower side edge portion of the replacement top housing portion back wall being contiguous with a top side edge portion of the back wall of the existing bottom housing portion, whereby, in the resulting upgraded computer, the existing bottom housing portion and the remaining existing internal operating components are economically reused.

11. The method of claim 10 wherein:

said replacement drive bay structure is adapted to operatively receive a plurality of floppy disk drives and has a front end portion, and said method further comprises the step of forming an opening in the from end wall portion of said replacement top housing portion, said opening being configured to complementarily receive and exteriorly expose said front end portion of said replacement drive bay structure in the upgraded computer.

12. The method of claim 10 further comprising the step of:

providing said replacement top housing portion with a back wall segment depending from a rear edge portion of its top side wall, said back wall segment having a vertical height generally equal to the height difference between the existing and replacement top housing portions, and a lower side edge portion positioned to be contiguous with an upper side edge portion of the back wall of the existing bottom housing portion when said replacement top housing portion is operatively connected to the existing bottom housing portion.

13. The method of claim 10 wherein:

said replacement expansion card cage structure has a rear end portion defining an I/O port structure, and said method further comprises the step of configuring a rear end portion of said replacement top housing portion to cooperate with a rear end portion of the existing bottom housing portion in a manner combinatively defining therewith a housing opening which, in the upgraded computer, complementarily receives and exteriorly exposed said I/O port structure.

14. The method of claim 10 wherein:

the existing expansion card cage structure has an auxiliary cooling fan removably snap-fitted thereon, and said method further comprises the steps of removing the auxiliary cooling fan from the existing expansion card cage structure and snap-fitting the removed auxiliary cooling fan onto said replacement expansion card cage structure.

15. The method of claim 10 wherein:

the existing operating components further include a motherboard, left in place in the upgraded computer, said replacement expansion card cage structure is adapted to operatively receive its associated expansion cards for movement therewith, and is operatively connectable to the motherboard in a manner operatively connecting the associated expansion cards to the motherboard as well, and said step of replacing the removed expansion card cage structure includes the step of operatively connecting said replacement expansion card cage structure to the motherboard.

* * * * *